United States Patent Office 2,909,409
Patented Oct. 20, 1959

2,909,409

PROCESS FOR COOLING HOT GASES CONTAINING SUSPENDED TITANIUM DIOXIDE PARTICLES

Paul Gregory, Paris, France, assignor to Fabriques de Produits Chimiques de Thann et de Mulhouse, Thann, France, a corporation of France No Drawing. Application December 4, 1956
Serial No. 626,098

Claims priority, application France December 8, 1955

5 Claims. (Cl. 23—202)

This invention relates to a process for cooling hot gases containing a suspension of titanium dioxide particles. More particularly, the invention relates to the recovery of titanium dioxide pigments from hot reaction gases obtained by the vapor phase decomposition of a volatile titanium halide, such as titanium tetrachloride.

In the production of titanium dioxide pigments, titanium tetrachloride vapor is reacted with oxygen containing gases thereby producing a hot suspension of very finely divided titanium dioxide in hot reaction gases containing chlorine in a predominating amount, frequently mixed with nitrogen and carbon dioxide. Such gases, after the separation of the titanium dioxide, may be used directly, or indirectly, for chlorinating titanium containing raw materials.

The reaction may be carried out in a reaction chamber as a flaming combustion by the introduction of the reaction gases into a suitable burner. The reaction requires a very short time and is accompanied by an evolution of heat and light. The temperature of the reaction and the hot decomposition products is high, about 1000° C., or above, and, for example, may reach 1100° to 1200° C.

On a large industrial scale, the cooling of the hot reaction, or decomposition, products containing the gaseous suspension of hot finely divided titanium dioxide is a very difficult problem to solve in an economically feasible manner. The large volume of gases obtained, their high temperature, the presence of titanium dioxide in suspension, the corrosiveness of the gases at high temperature which excludes, or restricts, the use of metals in contact with the gases in a cooling system; and the desirability of quenching the gases as soon as the decomposition reaction is effected in order to preserve the quality of the titanium dioxide, all present very difficult production problems.

In order to effect a rapid and economically feasible cooling of the reaction mixture several methods have been proposed.

The only practical method suggested, which avoids excessive dilution of chlorine, uses the gases produced by the reaction. In this method, after separation of the suspended titanium dioxide from the decomposition reaction gases, the gases are adequately cooled and added to hot reaction products in an amount sufficient to obtain the desired degree of cooling. When using a cyclic process, a quantity of reaction gases equal to that produced in each cycle is regularly removed from the cycle.

The return of reaction gases to the system has the stated advantage of not diluting the chlorine but the volume of the recirculated gases increases very rapidly as the final desired temperature decreases. From the practical viewpoint, the return of cooled decomposition reaction gases can be used only to quench the temperature of the hot reaction products to a temperature which is still relatively high. The volume of the equipment necessary to cool to low temperatures becomes impractical. Yet, cooling to temperatures much lower than reaction temperatures has many advantages. The major advantage is obtained by suppressing, or limiting, the corrosive action of the reaction products thereby permitting the use of metallic equipment, such as cyclones, electrostatic precipitators, metallic heat exchangers, or the like, for the treatment of the reaction products.

It is the principal object of this invention to provide a new and improved process for cooling a hot gaseous suspension of titanium dioxide produced by the decomposition of a titanium halide having, among others, the following advantages:

(1) The gaseous reaction products are cooled quickly.

(2) The cooling may be effected to a low temperature at which the corrosive reactions on metallic equipment are reduced to a point which permits the use of such equipment for further processing of the gases.

(3) The cooling to the stated low temperature may be accomplished without increasing the volume of gases handled.

(4) The use of diluent gases is avoided, thereby facilitating recovery of valuable by-product gases.

(5) The introduction of contaminants is avoided, thereby maintaining the purity of the titanium dioxide.

(6) The required equipment is relatively small in size and is exceedingly simple and cheap.

The foregoing, and other advantages, are obtained by cooling a hot gaseous suspension of titanium dioxide produced by the decomposition of a titanium halide at elevated temperatures by continuously introducing into a stream of said suspension relatively cool finely divided titanium dioxide in an amount sufficient to form a mixture having a desired temperature.

In accordance with one embodiment of the invention, the titanium dioxide used for cooling is produced in the decomposition process. Due to the finely divided particle size of the added titanium dioxide, usually below 1 micron, heat exchange with the gaseous decomposition reaction products is almost instantaneous, and yet, the titanium dioxide is not contaminated by the coolant. The titanium dioxide used for cooling may be separated from the system by conventional means. Then this separated material consisting essentially of finely divided titanium dioxide, may be injected into the gas stream resulting from the decomposition of the titanium halide in any suitable manner, such as, with a suitable mechanical device. On the other hand, the finely divided titanium dioxide may be dispersed in relatively cold gases; and, preferably, gases produced in the decomposition reaction to form a relatively cool gaseous suspension of finely divided titanium dioxide.

In accordance with an important, and preferred, embodiment of the invention, the titanium dioxide is introduced into the decomposition gas stream at a point where the reaction is completed. Such a procedure avoids the coarsening of the titanium dioxide pigments which may result if the finely divided relatively cold titanium dioxide particles are introduced into the reaction gas stream at a point where the reaction is still taking place.

Preferably, the amount of titanium oxide added will be sufficient to cool the reaction gases to a temperature below 400° C., or even below 300° C., after which metallic equipment may be used for further treatment of the reaction products obtained.

After the above described cooling, the titanium dioxide is entirely, or partly, separated from the gases by cyclones, electrostatic filters, or other means known to those skilled in the art. In a cyclic system, an amount equal to the production of the system is removed from the system and the balance is cooled to a relatively cool gaseous suspension of finely divided titanium dioxide and used for cooling further quantities of decomposition products. Appropriate amounts of by-product gases may be bled from the system to avoid a build-up of gases in the system.

The by-product gases may be used entirely for chlorinating further titanium containing raw materials, or, if desired, may be used partly for the cooling cycle, with, or without, elimination of any titanium dioxide remaining in suspension.

A selection of the proper proportion of cooling titanium dioxide to be added to the gaseous reaction product being cooled will depend on the final temperature desired. A determination of the proper amount of titanium dioxide to be added is easily calculated, since the specific heats of the substances present is known and the very large surfaces of the obtained pigment assures almost instantaneous heat transfer between the added solid and the gaseous reaction mixture.

In the following three tables a comparison is made between processes for cooling hot gaseous suspensions of titanium dioxide produced by the oxidation decomposition of a titanium halide in which cooling is effected, respectively, by the process of this invention and the prior art processes of recycling by-product gases.

Table I

In the following table calculations are shown for the specific heat of a typical gaseous decomposition reaction mixture produced from titanium tetrachloride and having the composition shown in the table. Similar calculations may be effected easily for gases of a different composition.

| Gas composition to be cooled (Volumes) | | Weights of constituent per m.³ | For 100 kg. of products of reaction | | Mean specific heat |
|---|---|---|---|---|---|
| | | | Weights, kgs. | Volumes (cubic meters at 0° C./760 mm.) | |
| | Percent | | | | |
| $Cl_2$ | 30 | $\frac{71}{22.4} \times 0.30 = 0.950$ | 36.6 | 11.6 | 0.12 cal./gr. $\times$ 36.6 = 4.4 |
| $N_2$ | 30 | $\frac{28}{22.4} \times 0.30 = 0.375$ | 14.5 | 11.6 | 0.25 cal./gr. $\times$ 14.5 = 3.6 |
| $CO_2$ | 30 | $\frac{44}{22.4} \times 0.30 = 0.589$ | 22.8 | 11.6 | 0.20 cal./gr. $\times$ 22.8 = 4.5 |
| $O_2$ | 10 | $\frac{32}{22.4} \times 0.10 = 0.143$ | 5.5 | 3.9 | 0.22 cal./gr. $\times$ 5.5 = 1.2 |
| $TiO_2$ | | $\frac{80}{142} \times 0.950 = 0.535$ | 20.6 | 0.005 | 0.168 cal./gr. $\times$ 20.6 = 3.5 |
| | 100 | 2.592 | 100.0 | 38.705 | [1] 17.2 |

[1] Cal. for 100 gr.

Thus the mean specific heat is about 0.17 cal./gr., i.e., practically the same as for $TiO_2$ which is 0.168 cal./gr.

Table II

In the following table, X = the weight of $TiO_2$ in kg. at 20° C., necessary for cooling 100 kg. of decomposition reaction product as disclosed in Table I, originally having a temperature of 1000° C. to a temperature indicated in the table.

| Temperature desired in ° C. | Calculation | Weights, Cooling $TiO_2$ in kg. | Volumes | |
|---|---|---|---|---|
| | | | Cooling $TiO_2$ in liters (Sp. Gr. 4.2) | Gases to be cooled in m.³ (NTP) |
| 800 | 800−X (800−20)=100 (1,000−800) | 26 | 6 | 38.7 |
| 600 | 600−X (600−20)=100 (1,000−600) | 69 | 17 | 38.7 |
| 400 | 400−X (400−20)=100 (1,000−400) | 158 | 38 | 38.7 |
| 300 | 300−X (300−20)=100 (1,000−300) | 250 | 60 | 38.7 |
| 200 | 200−X (200−20)=100 (1,000−200) | 445 | 106 | 38.7 |
| 100 | 100−X (100−20)=100 (1,000−100) | 1,125 | 268 | 38.7 |

Table III

The following table shows the volumes of gases obtained from the decomposition of titanium tetrachloride necessary to be recycled in order to obtain the several final temperatures indicated. In the table, the volume of decomposition gases being cooled is assumed to be 100 volumes and the temperature of the gases is assumed to be 1000° C. The temperature of the recycled gases is assumed to be 50° C. and their volume is represented by the letter V.

| Temperature desired | V Calculation | Volume to be recycled V | Total Volume 100+V | Dilution Ratio $\frac{100+V}{100}$ |
|---|---|---|---|---|
| 800° C | 100 (1,000−800)=V (800−50) | 27 | 127 | 1.27 |
| 600° C | 100 (1,000−600)=V (600−50) | 73 | 173 | 1.73 |
| 400° C | 100 (1,000−400)=V (400−50) | 170 | 270 | 2.70 |
| 300° C | 100 (1,000−300)=V (300−50) | 280 | 380 | 3.80 |
| 200° C | 100 (1,000−200)=V (200−50) | 530 | 630 | 6.30 |
| 100° C | 100 (1,000−100)=V (100−50) | 1,800 | 1,900 | 19.00 |

By a comparison of the figures in the foregoing tables it is easy to see the tremendous advantage, with respect to the volumes handled, obtained by using the process of this invention as compared with cooling by means of recycled cool gases in accordance with the prior art practices. This advantage is particularly striking where the temperatures of the reaction products are lowered to a point where corrosive action on metallic equipment is practically non-existent.

The power necessary for conveying relatively large amounts of titanium dioxide through the system will be practically the same as that necessary for the circulation of equal weights of gases. Thus, there is no substantial economic penalty in using finely divided titanium dioxide as a coolant.

Although the description of the present invention refers to cooling finely divided titanium dioxide produced by gaseous decomposition of titanium tetrachloride with oxygen containing gases, a reaction of a special practical interest, the invention is not limited to this special case, but also covers cooling titanium dioxide obtained by gaseous decomposition of other volatile titanium halides wherein the decomposition is obtained by a reaction using oxygen, or an oxygen delivering compound such as water vapor, as a reactant for introducing oxygen into the titanium molecule.

I claim:

1. A process for directly cooling a hot gaseous suspension of pigmentary titanium dioxide produced by the decomposition of a titanium halide at elevated temperatures, which comprises rapidly cooling said suspension by continuously introducing into a stream of said suspension, relatively cool, finely divided pigmentary titanium dioxide having particle sizes substantially the same as those of the titanium dioxide particles contained in said gaseous suspension and in an amount at least equal to that contained in said hot gaseous suspension sufficient to form a mixture having a desired substantially reduced temperature.

2. A cyclic process for directly cooling a hot gaseous suspension of pigmentary titanium dioxide produced by the decomposition of a titanium halide at elevated temperatures, which comprises rapidly cooling said suspension by continuously introducing into a stream of said suspension a relatively cool finely divided pigmentary titanium dioxide having particle sizes substantially the same as those of the titanium dioxide particles contained in said gaseous suspension and in an amount sufficient to form a mixture having a temperature below 400° C., further cooling and separating part of the pigmentary titanium dioxide from the resulting suspension and returning the separated part to the cycle to cool further quantities of titanium dioxide produced by the decomposition of the titanium halide.

3. A process for directly cooling a hot gaseous suspension of pigmentary titanium dioxide produced by the decompositon of a titanium halide at elevated temperatures, which comprises rapidly cooling said suspension by continuously introducing into a stream of said suspension a relatively cool and finely divided pigmentary titanium dioxide having particle sizes substantially the same as those of the titanium dioxide particles contained in said gaseous suspension and in an amount at least equal to that contained in said hot gaseous suspension sufficient to form a mixture having a desired substantially reduced temperature, said titanium dioxide being introduced in the form of a cool gaseous suspension.

4. A process for directly cooling a hot gaseous suspension of pigmentary titanium dioxide produced by the decomposition of a titanium halide at elevated temperatures of at least about 1000° C., which comprises rapidly cooling said suspension by adding to said hot gaseous suspension a relatively cool gaseous suspension of pigmentary titanium dioxide having particle sizes substantially the same as those of the titanium dioxide particles contained in said gaseous suspension and in an amount sufficient to form a mixture having a temperature below 400° C.

5. A process for directly cooling a hot gaseous suspension of pigmentary titanium dioxide produced by the decomposition of a titanium halide at elevated temperatures, which comprises rapidly cooling said suspension by: flowing a continuous stream of said hot suspension from the zone of decomposition, cooling said hot suspension, and introducing into said stream of said hot suspension an amount of the cooled suspension equal to at least 27% of the volume of said stream, the titanium dioxide in said cooled suspension having particle sizes substantially the same as those of the titanium dioxide particles contained in said hot suspension.

References Cited in the file of this patent

UNITED STATES PATENTS

| | | |
|---|---|---|
| 2,420,542 | Jahnig | May 13, 1947 |
| 2,508,272 | Booge | May 16, 1950 |
| 2,721,626 | Rick | Oct. 25, 1955 |